Aug. 22, 1939.   P. KLAMP ET AL   2,170,501
PERIPHERAL MACHINING APPARATUS
Filed Jan. 28, 1937   6 Sheets-Sheet 1

INVENTORS
Paul Klamp and
F. L. Bergstrom
by Carlton Hill & Gravely
THEIR ATTORNEYS.

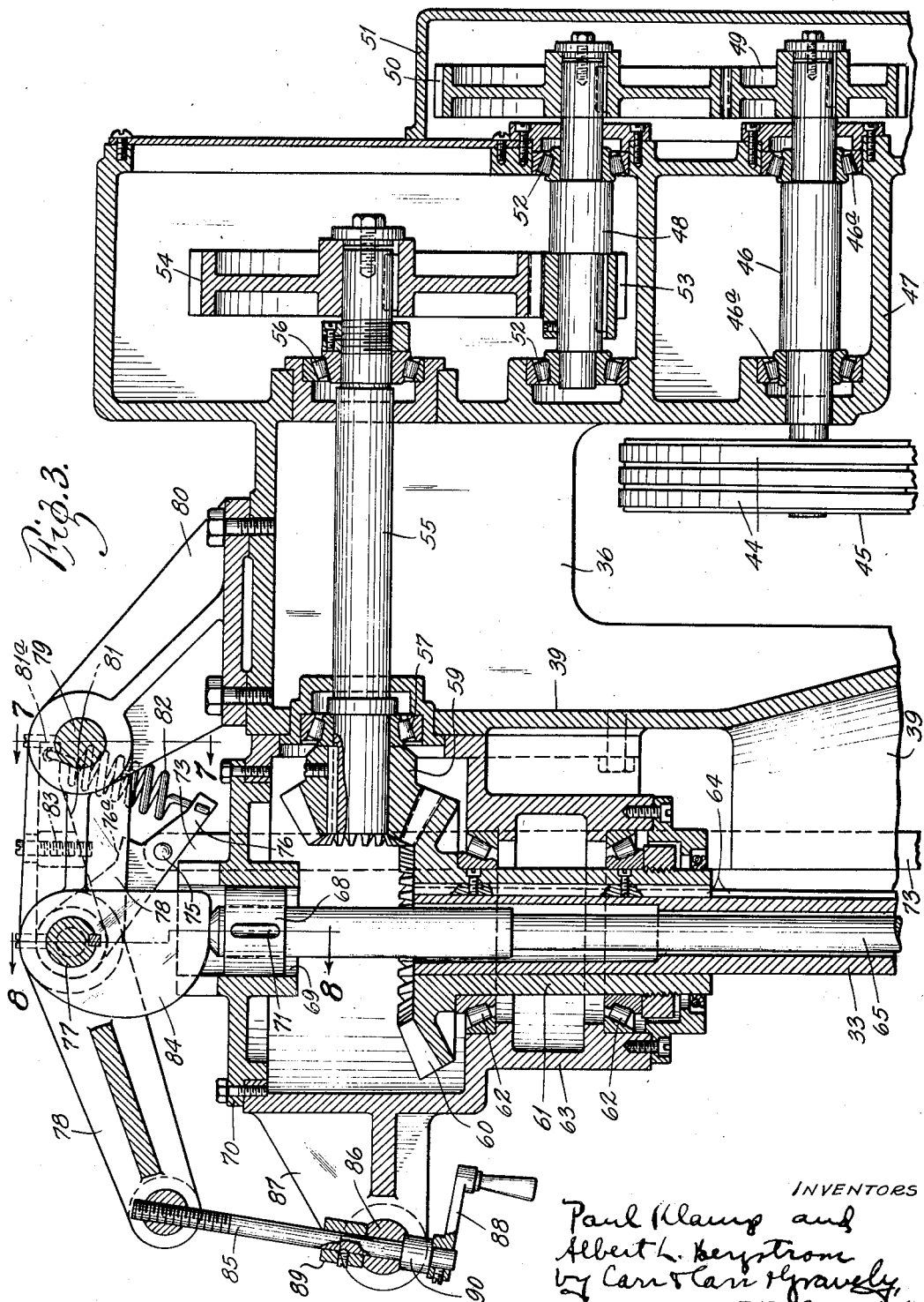

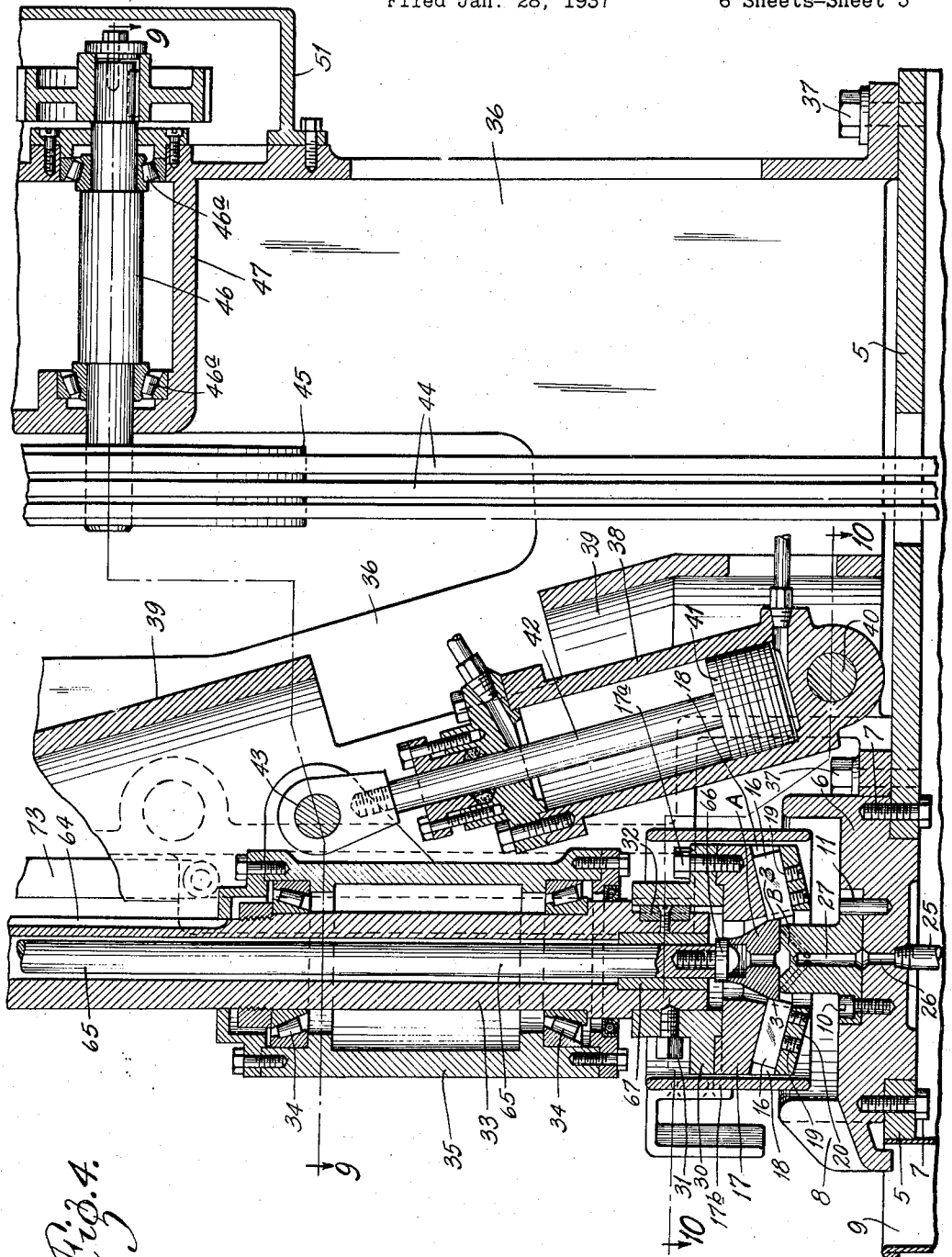

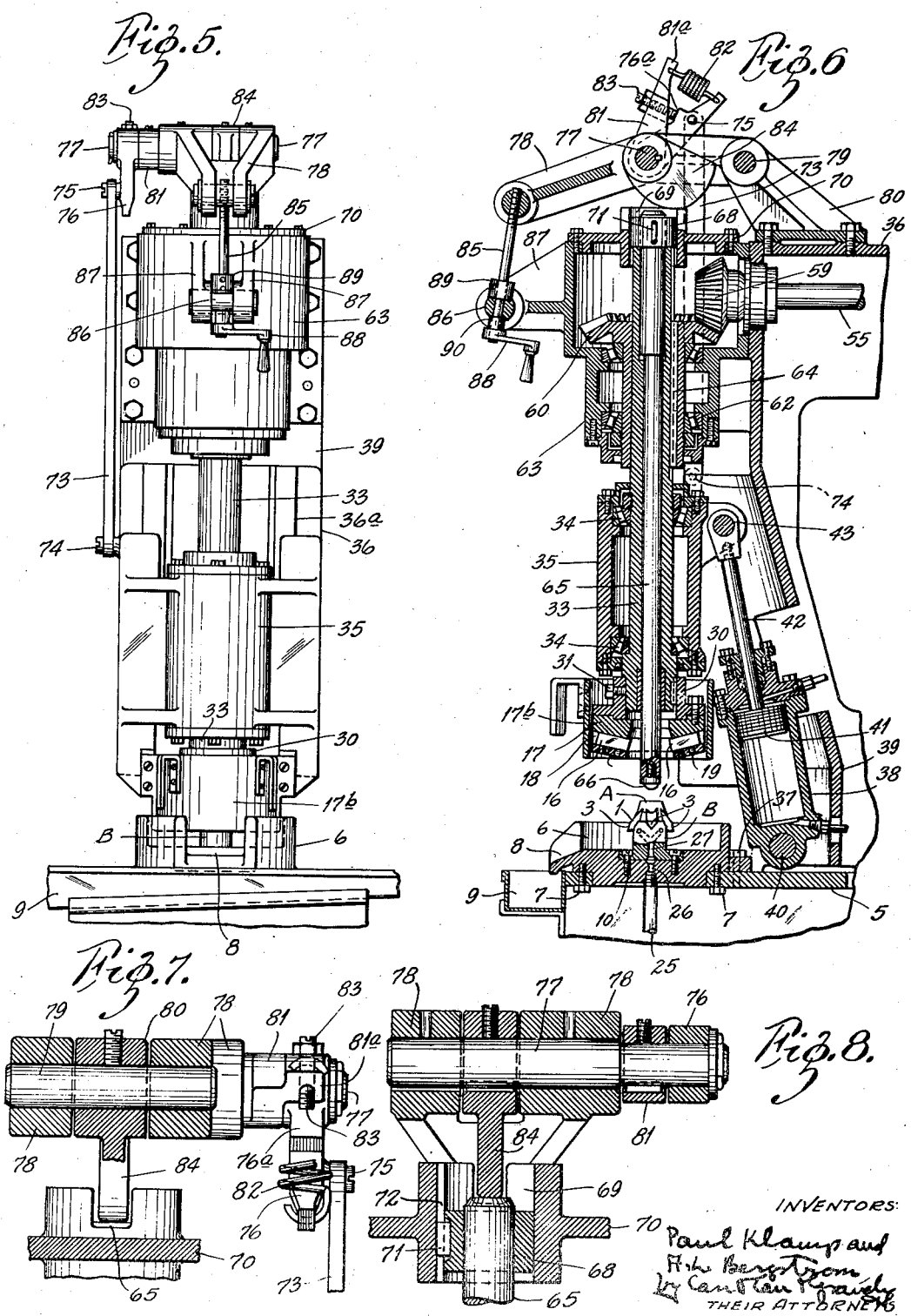

Aug. 22, 1939.   P. KLAMP ET AL   2,170,501
PERIPHERAL MACHINING APPARATUS
Filed Jan. 28, 1937   6 Sheets-Sheet 5
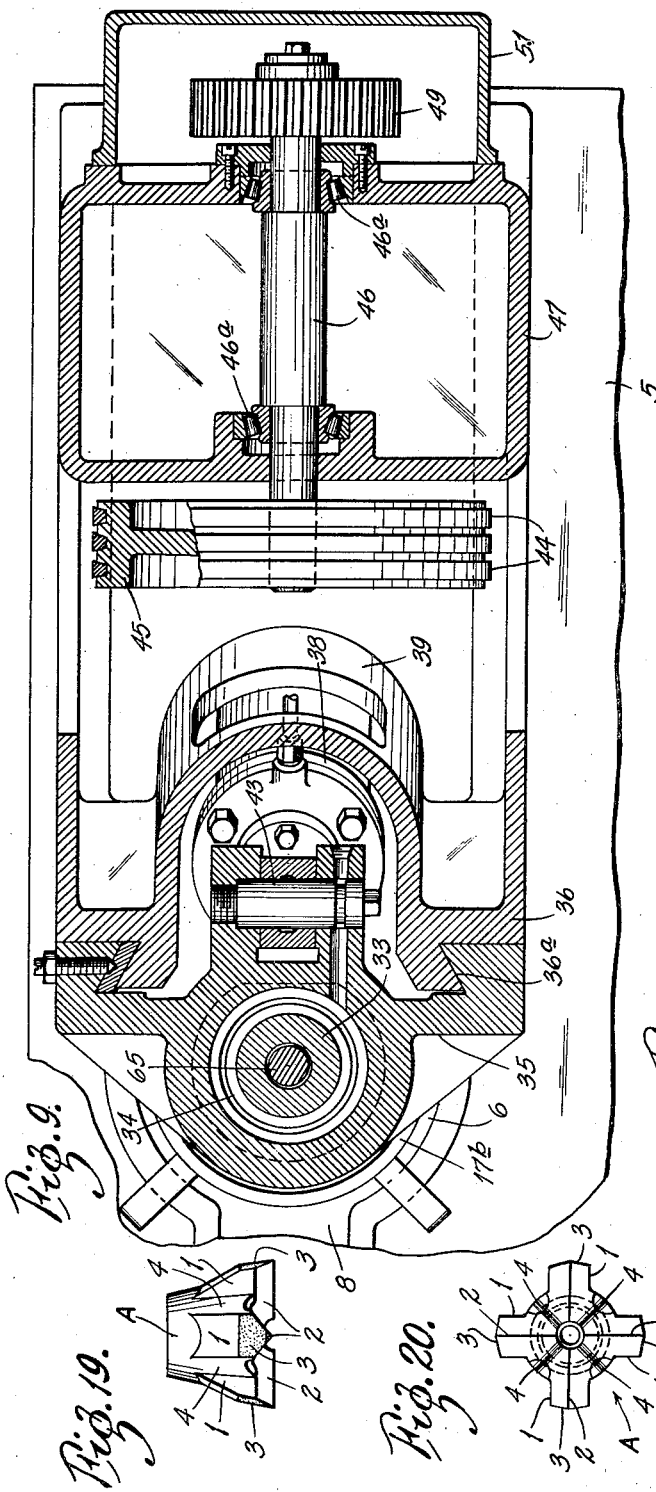
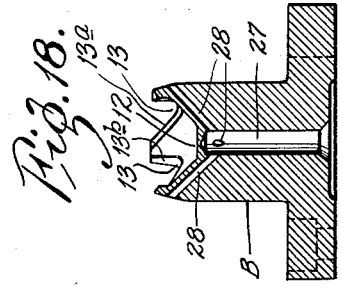
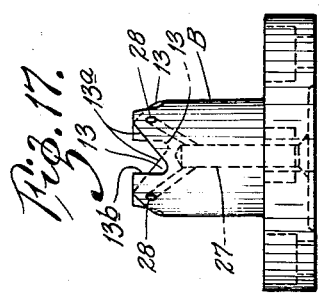
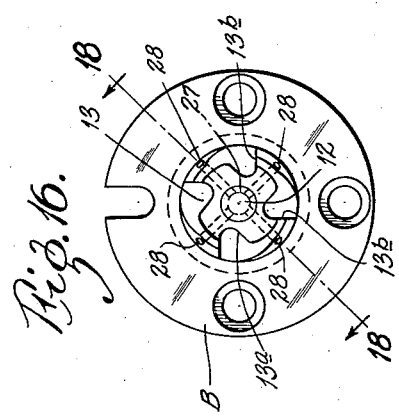
INVENTORS.
Paul Klamp and
Albert H. Bergstrom
by Carr, Carr & Gravely
THEIR ATTORNEYS Aug. 22, 1939.　　　P. KLAMP ET AL　　　2,170,501
PERIPHERAL MACHINING APPARATUS
Filed Jan. 28, 1937　　　6 Sheets-Sheet 6
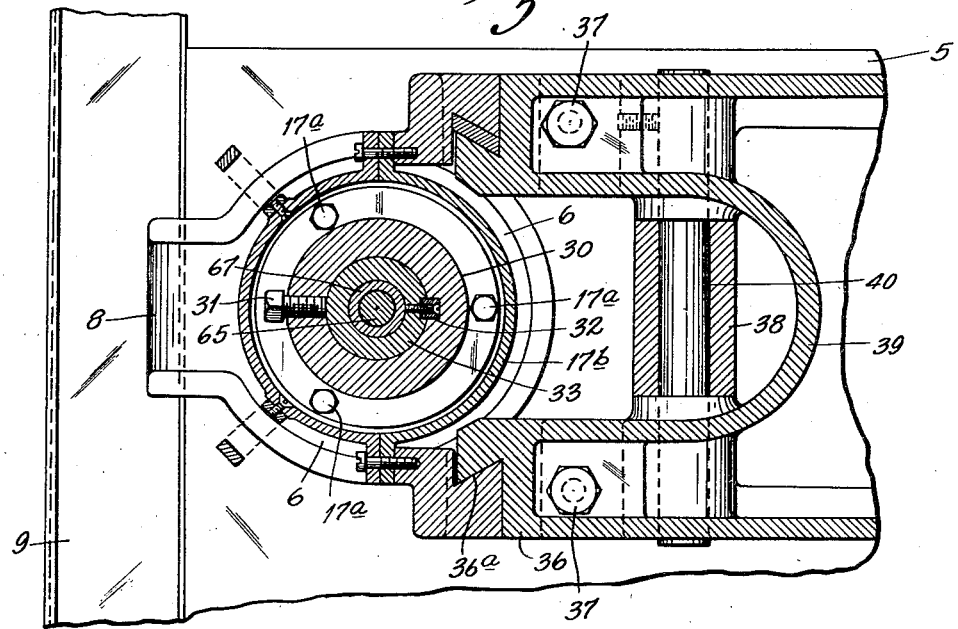
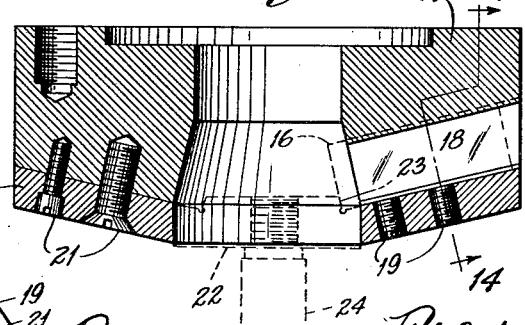
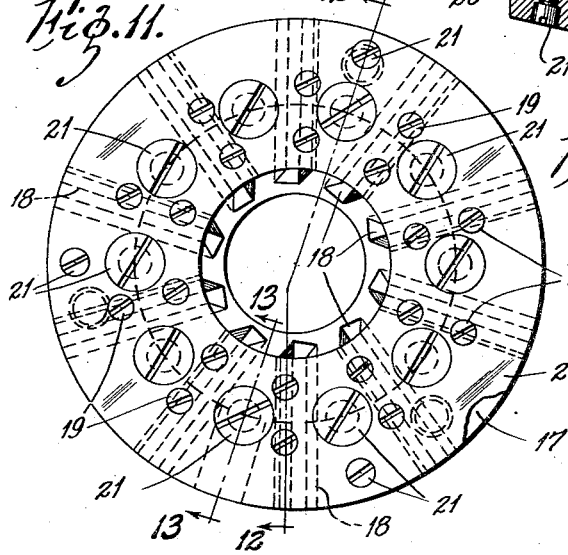
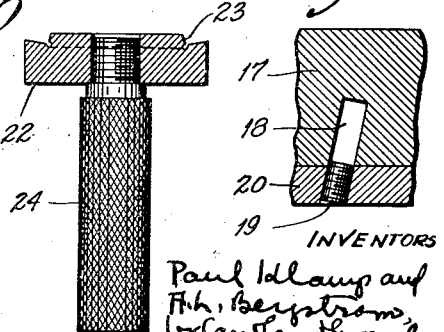
INVENTORS
Paul Klamp and
A. H. Bergstrom,
by Carsten & Gravely
THEIR ATTORNEYS.

Patented Aug. 22, 1939

2,170,501

UNITED STATES PATENT OFFICE 2,170,501

PERIPHERAL MACHINING APPARATUS

Paul Klamp and Albert L. Bergstrom, Canton, Ohio, assignors to The Timken Roller Bearing Company, Canton, Ohio, a corporation of Ohio Application January 28, 1937, Serial No. 122,738

19 Claims. (Cl. 90—14)

This invention relates to apparatus for machining the conical peripheral surfaces of articles such, for instance, as the conical peripheral surfaces of drill bits.

It has for its principal objects to provide an apparatus which will quickly and accurately machine the conical or beveled peripheral surfaces of drill bits that can be readily adjusted for bits of different lengths, diameters and taper, that will provide for quickly and accurately positioning the bit in the apparatus and for locking it therein during the machining operation, that will provide for lubricating and cooling the cutting tools, that will be simple and economical in construction and of compact design and that will embody other advantages hereinafter appearing. The invention consists in the bit machining apparatus and in the construction, combinations and arrangements of parts hereinafter described and claimed.

In the accompanying drawings, which form part of this specification and wherein like symbols refer to like parts wherever they occur, Fig. 1 is a plan view of a drill bit machining apparatus embodying my invention;

Fig. 3 is an enlarged central vertical longitudinal section through the upper portion of the apparatus;

Fig. 4 is a similar section through the lower portion of the apparatus;

Fig. 5 is a front elevation of the apparatus;

Fig. 6 is a view similar to Fig. 2 showing the machining mechanism in raised position;

Fig. 7 is a fragmentary vertical cross-section on the line 7—7 in Fig. 3;

Fig. 8 is a similar cross-section on the line 8—8 in Fig. 3;

Fig. 9 is a horizontal section on the line 9—9 in Fig. 4;

Fig. 10 is a fragmentary horizontal section on the line 10—10 in Fig. 4;

Fig. 11 is a bottom view of the tool head with the machining tools mounted therein;

Fig. 12 is a vertical section on the line 12—12 in Fig. 11;

Fig. 13 is a fragmentary vertical section on the line 13—13 in Fig. 11;

Fig. 14 is a fragmentary section on the line 14—14 in Fig. 12;

Fig. 15 is a side elevation, partly in section, of the cutter adjusting device;

Fig. 16 is a plan view of the bit holder;

Fig. 17 is a side elevation of said holder;

Fig. 18 is a diametral section through said holder on the line 18—18 in Fig. 16;

Fig. 19 is a side elevation of the drill bit that is to be machined in said holder; and Fig. 20 is a view looking at the bottom or cutting end of said bit.

Figure 1:
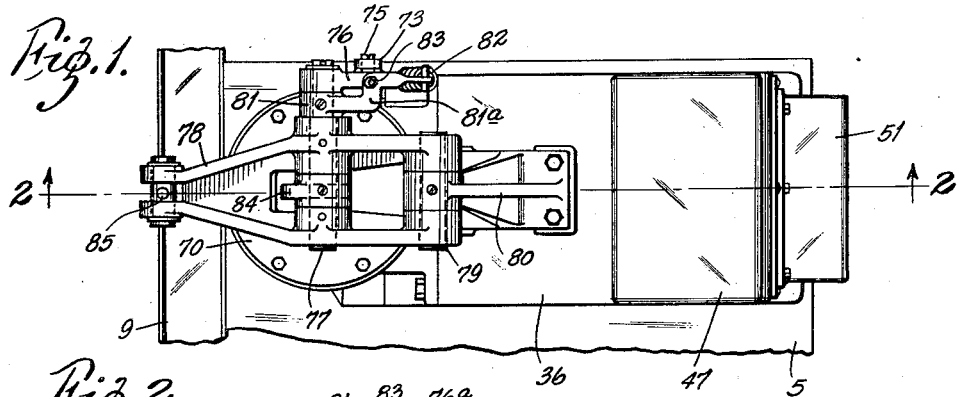
Figure 2:
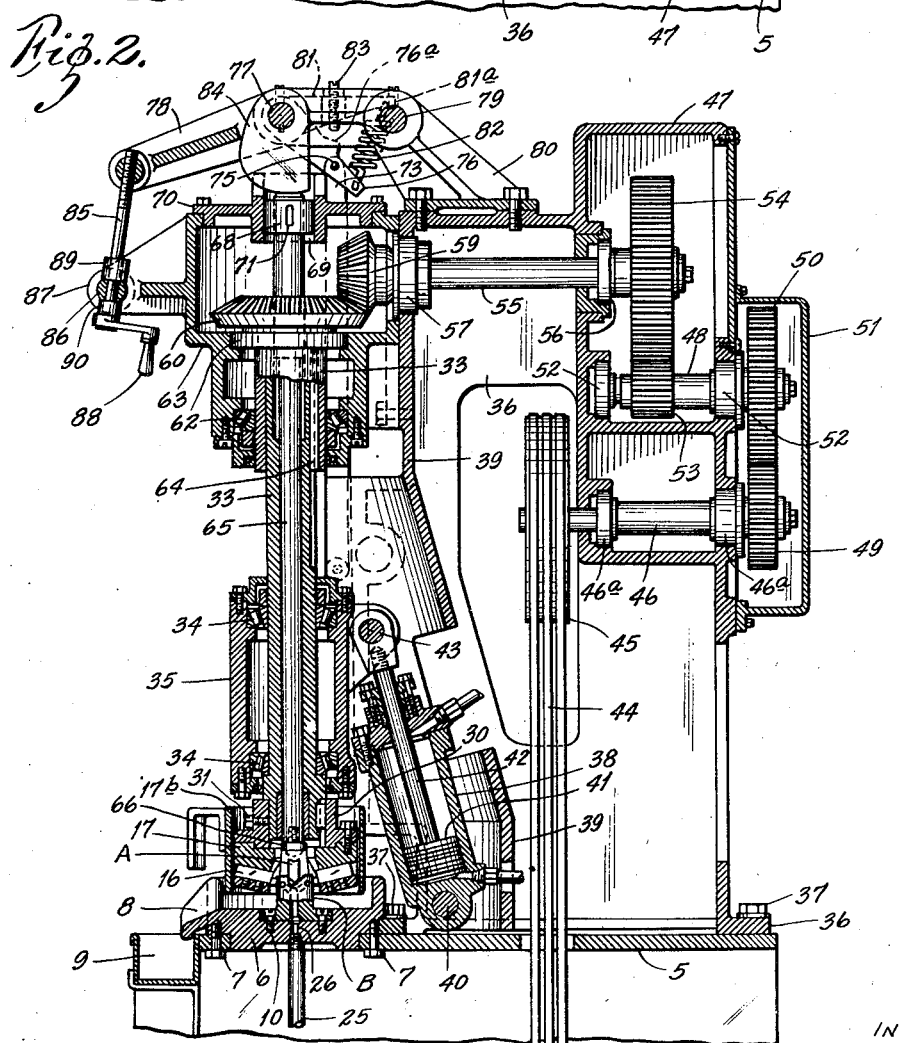
Fig. 2 is a central vertical longitudinal section on the line 2—2 in Fig. 1.

As shown in Figs. 19 and 20, a drill bit A of the type that is to be machined is provided at its cutting end with four radially disposed wings or ribs 1 having V-shaped lower marginal portions 2 that form cutting edges that extend from end to end of said wings. These wings terminate beyond the body portion of the bit in conical or downwardly diverging peripheral end faces 3. The wings 2 are separated by re-entrant angles or valleys 4 formed by the V-shaped lower marginal portions thereof; and these valleys intersect the peripheral surface of the main body portion of the bit at points that are spaced inwardly from the ends of said wings.

The apparatus for machining the conical peripheral end faces 3 of the wings of the above bit comprises a bench or base plate 5 having a vertical opening therein in which the reduced lower end portion of a pan 6 is removably secured to said bench plate by means of cap screws 7, and is provided with an outlet opening 8 that discharges into a trough 9 at the front edge of said plate. The bottom of the pan 6 is provided with a central circular recess adapted to receive the enlarged cylindrical base portion of a bit nest or support B, which is rigidly secured to said pan by means of cap screws 10 and a dowel pin 11. The upper end of the bit holder B is provided with a central circular recess 12 and a series of circumferentially spaced radially extending grooves or notches 13 adapted to receive and support the bit wings 1, which extend outwardly beyond said holder. As shown in Figs. 16, 17 and 18, each of the notches 13 in the top of the bit holder or nest B has one side wall 13a sloped to conform to the slope of the adjacent side surface of the wing seated therein. The other side surface 13b of said notch is disposed vertically and is adapted to cooperate with the portion of the wing located above the beveled lower edge thereof to prevent rotation of the bit in the direction of said vertical surface.

The mechanism for machining the conical peripheral end faces 3 of the bit comprises a plurality of cutter bars 16 disposed radially of the bit holder axis in an annular tool head 17 disposed concentric therewith. Each of these tools or cutter bars is mounted in a slideway 18 that is disposed radially of the annular tool head and slopes downwardly from the outer periphery thereof to the central opening therein. The tools extend into this central opening with their cutting ends in position to engage the end faces 3 of the wings 1 of the bit A. Said tools are held in proper longitudinal adjustment by means of set screws 19 that are threaded into the lower end of the tool head in abutting relation to the lower edges of said tools. For convenience in manufacture, the portion of the holder 17 beneath the radial tool receiving slideways 18 is made in the form of a plate 20 that is removably secured to the upper or main body portion of said holder by means of screws 21. The tool bars 16 are accurately positioned in the holder 17 by means of a set-up plug 22 (see Fig. 15) which fits within the central opening in the tool holder (see Fig. 12) and has an annular shoulder 23 thereon adapted to space the cutting ends of said tools equal distances from the axis of said holder. A separate set-up plug is provided for each size of rock bit that is to be machined; and each plug is provided with a threaded axial hole adapted to receive the threaded end of a knurled handle 24.

The radially disposed tool slideways 18 in the tool head 17 slope downwardly from the outer periphery of said head to the axial bore thereof at an angle that will position the inner or cutting edges of the machining tools 16 at the angle desired for the conical peripheral surfaces 3 at the ends of the wings 1 of the bit. These slideways are also tilted crosswise at an oblique angle to the axis of the tool head (see Fig. 14) so that the tops of the cutting edges of the rotating tools 16 will be leading and the bottom trailing when the head is rotated in the proper direction. By this arrangement, the tools form a shearing cut; that is, their cutting edges move forward and downward at the same time, thereby producing a smooth cut and improved finish on the wing surfaces of the bit and also causing said edges to exert a downward thrust on said surfaces and thus hold said bit down in its nest.

The cutting ends of the tools 16 are lubricated and cooled by a stream of cutting oil, which is forced upwardly from a suitable supply pipe 25 through registering axial bores 26 and 27 in the pan 6 and nest B, respectively, and thence through branch passageways 28 that lead outwardly and upwardly from the bore in said bit and open through the outer surface thereof into the tool head 17 opposite the cutting edges of said tools. These branches are disposed radially of the bit nest, incline upwardly and are located between the wing receiving notches 13 of said bit so that the oil spouting from said branches is discharged against the cutting end of each tool as it passes from one wing to the next and thus serves to lubricate and cool the tool and wash the chips therefrom out of the tool head into the pan 6 located therebelow. The used oil flows from the pan through the discharge opening 8 therein into the trough 9; and the chips collected in the pan may be scraped through said opening into said trough and easily removed therefrom.

The tool head 17 is removably secured by means of cap screws 17a to the lower end of a cylindrical adapter sleeve 30, which is rigidly secured by means of a set screw 31 and a key 32 to the lower end of a vertically disposed, hollow cylindrical spindle 33 disposed in axial alinement with the bit nest B located therebelow. This spindle is supported for rotary but non-axial sliding movement in suitable antifriction bearings 34 in a support 35 that is slidably mounted in a vertical dovetail slideway 36a (see Fig. 9) provided therefor in the front face of an upstanding frame 36 that is secured by screws 37 to the bench plate 5. A cylindrical guard sleeve 17b surrounds the tool head 17 and is removably secured to the front face of the slide 35 for movement therewith. Up-and-down motion is imparted to the spindle supporting slide 35 to raise and lower the tool head 17 by a hydraulic cylinder 38 located back of said slide in a forwardly opening channeled portion 39 of the main frame 36. This cylinder has its lower end pivotally supported, as at 40, on said frame and is provided with a piston 41 whose rod 42 passes through the upper end of said cylinder and is pivotally secured, as at 43, to the back of the spindle supporting slide 35.

The tool head supporting spindle 33 is preferably driven from an electric motor or other device (not shown) that is located beneath the bench plate 5 and has a suitable belt connection 44 with a pulley 45 fixed to a horizontal shaft 46 mounted in suitable bearings 46a in a gear housing 47 formed at the rear upper corner of the frame 36. The pulley 45 is fixed to the forward end of the shaft 46 outside of the housing 47; and the drive is transmitted from said shaft to a countershaft 48 located thereabove in said housing through intermeshing change gears 49 and 50 that are removably secured to the rear ends of the respective shafts and are enclosed within a cover plate 51 secured to the rear face of said housing. The countershaft 48 is journaled in suitable bearings 52 mounted in the housing 47 and is provided with a pinion 53 that drives a gear 54 fixed to the rear end of a horizontal shaft 55 located thereabove. The gear 54 is also enclosed within the gear housing 47, and the shaft 55 to which said gear is journaled in a bearing 56 mounted in the front wall of said housing and extends forwardly thereof and is supported in its forward end in a bearing 57 mounted in the semi-cylindrical guard or channel portion 39 of the main frame 36. The forward end of the shaft 55 terminates short of the spindle sleeve axis and has a bevel pinion 59 fixed thereto that drives a bevel gear 60 having a depending elongated hub portion 61 mounted for rotary but non-axial sliding movement in bearings 62 mounted in a housing 63 that is fixed to a portion of the frame and encloses said bevel gearing. The upper end of the spindle 33 extends into the hub 61 of the bevel gear 60 and is slidably splined thereto, as at 64, for axial sliding but non-rotary movement relative to said gear.

The mechanism for positively holding the bit A down in its nest B comprises a push rod or plunger 65 arranged for axial but non-rotary movement in the hollow spindle 33 and provided at its lower end with a replaceable contact piece or button 66 that bears against the upper end of said bit when the tool head moves down into operative position. The lower end portion of the push rod 65 is guided in a bushing 67 press-fitted in the lower end of the spindle 33; and the upper end of said push rod has an enlarged cylindrical head 68 fixed thereto that is slidably supported in a vertical bore 69 provided therefor in a removable cover 70 for the top of the gear housing. The head 68 of the push rod 65 is prevented from rotating in its supporting bore 69 by means of a key 71 that is fixed to said head and has a sliding fit in a keyway 72 provided therefor in said bore.

The push rod 65 is moved up and down by the up-and-down movement of the spindle supporting slide 35. The connection between said slide and said push rod comprises a link 73 having its lower end pivotally connected, as at 74, to said slide, and having its upper end pivotally connected, as at 75, to an arm 76 that is mounted for free vertical swinging movement on a horizontal shaft 77 that is rotatably supported in an arm 78 that is pivotally supported on a horizontal pin 79 mounted in an upstanding bracket 80 secured to the main frame rearwardly of the bevel gear housing 63. The arm 78 overhangs the upper end of the push rod 65; and the shaft 77 is journaled in said arm intermediate the ends thereof directly above said head. Fixed to the arm supported shaft 77 alongside of the arm 76 pivoted thereto is an arm 81 having its free end portion 81a offset to overlap the free end portion of the arm 76. A tension coil spring 82 yieldably connects the overlapping free end portions of arms 76 and 81; and the arm 81 that is fixed to the shaft 77 carries an adjustable stop-screw 83 adapted to be engaged by a surface 76a on the arm 76 that turns on said shaft. Fixed to the shaft 77 immediately above the push rod 65 is a cam 84 adapted to engage the upper end of said push rod and force the same downwardly into engagement with the bit that is to be machined.

The arm 78 extends forwardly of said gear housing 63 and has a threaded connection at its free end with the upper end of a screw 85 which extends downwardly through a transverse hole in a horizontal shaft 86 whose ends are rotatably supported in a pair of outstanding lugs 87 on the front face of said gear housing. The lower end of the adjusting screw is provided with an operating handle 88; and said screw is provided above and below the shaft 86 with collars 89 and 90 to prevent endwise movement thereof. Thus, the screw 85 provides means for swinging the arm 76 to locate the cam 84 thereon at the desired level; and it also serves to maintain said cam at such level.

In operation, when the slide 35 and the tool spindle 33 carried thereby are moved downwardly by the cylinder 38, the link 73 pulls the arm 76 downwardly, which arm also pulls the arm 81 downwardly due to its spring connection 82 therewith, thereby rotating the shaft 77 and the cam 84 fixed thereto in a clockwise direction until the push rod 65 is forced downwardly by said cam far enough to bring the contact button 66 at the lower end of said rod into contact with the bit A seated in the nest B. Continued downward movement of the slide 35 brings the cutting ends of the rotating tools 16 into contact with the ends 3 of the wings 1 of the bit. During such movement, the push rod 65 cannot move downwardly any farther, with the result that the arm 76 that is loose on the shaft 77 continues its downward swinging movement and moves away from the stop screw 83 on the arm 81 and increases the tension on the spring connection 82 between said arms, thereby increasing the downward pressure of the push rod on the bit A holding it securely in place. After the tools finish the cut, the slide 35 is moved upwardly by the cylinder 38 and the tool head 17 moves upwardly with said slide clear of the finished bit and the link 73 also moves upwardly and swings the arm 76 upwardly in a counter-clockwise direction until the abutment surface 76a thereof engages the stop screw 83 on the arm 81 and rotates it, the shaft 77 and cam 84 also in a counter-clockwise direction, thereby causing said cam to back away from the push rod head 65 far enough to permit the upper end of the spindle sleeve 33 to engage the underside of the push rod head 68 and thus lift the push rod off the bit far enough to permit the bit to be taken out of the nest. The cam 84 may be adjusted vertically according to the length of bit that is to be machined by raising or lowering the arm 78 by means of the adjusting screw 83.

In practice, the operating cylinder 38 is embodied in a hydraulic control system (not shown) and moves the slide 35 in an automatic cycle wherein the tool head 17 moves down rapidly almost to cutting position, then feeds more slowly throughout the major portion of the cutting, then finishing the last portion of the cutting feed with a still slower feed, and then moves up again rapidly and stops in its upper position to complete the cycle.

The foregoing apparatus has numerous advantages. The bit nest provides a perfect seat for the bit and prevents the bit from climbing out of the nest under the influence of the rotating tools. When the bit is dropped in the nest, it automatically centers itself therein without any further adjustment. The bit is also positively locked in the nest when the tools move into operative position and is released when said tools move to inoperative position.

The endwise tilt of the tools causes them to exercise a downward pressure on the bit and thus hold the bit down in the nest. The cross-wise tilt of the tools causes the tops of the cutting edges thereof to lead the bottom edges thereof when the tool head is rotated in the proper direction, thereby producing a smooth shearing cut and a smoother and better finish on the wing surfaces. The tool head may be readily mounted on and dismounted from the spindle and the tools changed for bits of different taper; and said tools may be quickly and accurately adjusted in the tool head for bits of different diameters by means of the adjusting plug shown in Figs. 12 and 15. The tools are supplied with oil through the nest, which oil serves to lubricate and cool the cutting edges of the tools, and wash the chips therefrom and out of the tool head. The arrangement of the oil discharge passageways of the tool nest causes a stream of oil to strike the cutting end of each tool before each engagement thereof with each wing of the bit, thereby further increasing the cooling and lubricating efficiency of the oil.

The slide actuated push rod mechanism provides a simple and efficient arrangement for raising and lowering the push rod and for locking it in the latter position; and the mounting of said rod in the hollow tool head spindle provides for greater compactness of design. The location of the slide operating cylinder back of the spindle slide and inside of the semi-cylindrical housing or channel portion of the main frame of the apparatus provides a compact mounting for said cylinder while rendering the latter accessible for inspection and repair.

Obviously, the hereinbefore described apparatus admits of considerable modification without departing from the invention. Therefore, I do not wish to be limited to the precise arrangement shown and described.

What we claim is:

1. A peripheral machining apparatus comprising a support for the article to be machined, a rotary tool head, means for moving said tool head axially into and out of engagement with said article, and means operable during the movement of said tool head into engagement with said article for holding the latter down on said support, said last mentioned means being operatively connected to said tool head moving means to be actuated thereby.

2. A peripheral machining apparatus comprising a support for the article to be machined, a rotary tool head movable axially into and out of engagement with said article, means operable during the engagement of said tool head with said article for holding the latter down on said support, and means operable by the axial movement of said tool head for engaging said hold-down means with said article before its engagement by said tool head and for disengaging said hold-down means from said article after said tool head is disengaged therefrom.

3. A peripheral machining apparatus comprising an upright rotary and axially movable tool head, a support for the article to be machined disposed below and in axial alinement with said tool head, said tool head being provided with an axial opening adapted to accommodate said article, and a plurality of tools mounted in said tool head with their cutting edges disposed in said opening and inclined at an oblique angle to the axis of said tool head in the direction of the rotary movement of said tool head, whereby said tools form a shearing cut and exert an axial thrust on said article in the direction of said support.

4. An apparatus for machining the conical peripheral surface of an article comprising an upright rotary and axially movable tool head, a member for supporting such article below and in axial alinement with said tool head with its small end uppermost, said tool head being provided with an axial opening adapted to accommodate said article, and a plurality of cutter bars mounted in said tool head radially thereof with their inner ends extending into said opening and provided with cutting edges, said cutter bars being inclined downwardly from their outer to their inner ends to position their cutting edges at the angle desired for the conical peripheral surface of said article and being tilted crosswise at an oblique angle to the axis of said tool head in the direction of the rotary movement of said tool head, whereby said cutting edges form a shearing cut and exert a downward thrust on said surface and thus hold said article down on the support therefor.

5. A peripheral machining apparatus comprising an upright rotary and axially movable tool head, a support for the article to be machined disposed in axial alinement with said tool head, said tool head being provided with an axial opening adapted to accommodate said article, a plurality of tools mounted in said tool head with their cutting edges disposed in said opening, said support being provided with a passageway adapted to discharge oil into said axial opening of said tool head opposite the cutting edges of said tools in the operative position thereof.

6. A peripheral machining apparatus comprising an upright rotary and axially movable tool head, a support for the article to be machined disposed in axial alinement with said tool head, said tool head being provided with an axial opening adapted to accommodate said article, a plurality of tools mounted in said tool head with their cutting edges disposed in said opening, said support being provided with a passageway leading upwardly therethrough and openings through the sides thereof and adapted to discharge oil onto the cutting edges of said tools when the latter are engaged with said article.

7. A peripheral machining apparatus comprising an upright rotary and axially movable tool head, a support for the article to be machined disposed in axial alinement with said tool head, said tool head being provided with an axial opening adapted to accommodate said article, a plurality of tools mounted in said tool head with their cutting edges disposed in said opening, said support being provided with a passageway leading upwardly therethrough and opening through the side thereof and adapted to discharge oil onto the cutting edges of said tools when the latter are engaged with said article, and a pan surrounding said support and adapted to receive said oil and the chips from said article.

8. A peripheral machining apparatus comprising an upright hollow cylindrical rotary and axially movable spindle, an annular tool head rigid with the lower end of said spindle, a support for the article to be machined disposed below and in axial alinement with said tool head, a plurality of tools mounted in said tool head with their cutting edges disposed in the opening therein, and a member disposed in said hollow spindle and operable by the tool engaging movement of said spindle to hold said article down on said support.

9. A peripheral machining apparatus comprising an upright hollow cylindrical rotary and axially movable spindle, an annular tool fixed to the lower end of said spindle concentric therewith, a support for the article to be machined disposed in axial alinement with said tool head, a plurality of tools mounted in said tool head with their cutting edges disposed in the opening therein, and an axially movable push rod disposed in said hollow spindle and operable by the tool engaging movement of said spindle to hold said article down on said support.

10. A peripheral machining apparatus comprising an upright hollow cylindrical rotary and axially movable spindle, an annular tool fixed to the lower end of said spindle concentric therewith, a support for the article to be machined disposed in axial alinement with said tool head, a plurality of tools mounted in said tool head with their cutting edges disposed in the opening therein, an axially movable push rod disposed in said hollow spindle and adapted during the engagement of said tools with said article to hold the latter down on said support, and means operable by the axial movement of said spindle for engaging said push rod with said article before its engagement by said tools and for disengaging said push rod from said article after said tools are disengaged therefrom.

11. A machining apparatus comprising a frame, a member mounted for vertical sliding movement thereon, a cylinder pivotally secured at its lower end to said frame, a piston in said cylinder having a rod extending beyond the upper end of said cylinder and pivoted to said slide member, an upright spindle mounted for rotary but nonaxial movement on said slide member, a tool head fixed to the lower end of said spindle, a support for the article to be machined disposed below said tool head, and means for rotating said spindle.

12. A machining apparatus comprising a frame, a member mounted for vertical sliding movement thereon, a cylinder pivotally secured at its lower end to said frame, a piston in said cylinder having a rod extending beyond the upper end of said cylinder and pivoted to said slide member, an upright spindle mounted for rotary but nonaxial movement on said slide member, a tool head fixed to the lower end of said spindle, a support for the article to be machined disposed below said tool head, and means for rotating said spindle, including a gear journaled in said frame and having a connection with said spindle permitting rotative axial movement but preventing relative rotary movement, said cylinder being located back of said slide member and said frame being provided with a channeled portion adapted to partially enclose said cylinder.

13. A peripheral machining apparatus comprising a frame, a member mounted for vertical sliding movement thereon, means for reciprocating said slide member, an upright spindle rotatably mounted on said slide member, a tool head fixed to the lower end of said spindle, a support for the article to be machined disposed below and in axial alinement with said tool head, said tool head being provided with an axial opening adapted to accommodate said article in the lower position of said spindle, an axially movable push rod disposed in said spindle and adapted during the engagement of said tool head with said article to press the latter down on its support, and means for rotating said spindle, said means including a bevel gear journaled in said frame and having a driving connection with said spindle adapted to permit the latter to move upwardly with said slide member and lift said push rod off said article after the tool head is disengaged therefrom.

14. A peripheral machining apparatus comprising a frame, a member mounted for vertical sliding movement thereon, means for reciprocating said slide member, a hollow upright spindle rotatably mounted on said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, and a push rod axially slidable in said spindle and adapted during the engagement of said tools with said article to hold the latter down on said support, said rod being operable by the movement of said slide member to engage said article prior to its engagement by said tools and to maintain such engagement until after said tools are disengaged from said article.

15. A peripheral machining apparatus comprising a frame, a member mounted for vertical sliding movement thereon, means for reciprocating said slide member, a hollow upright spindle rotatably mounted on said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, an axially movable push rod disposed in said spindle and adapted during the engagement of said tools with said article to hold the latter down on said support, and means operated by the movement of said slide member for engaging said push rod with and disengaging it from said article.

16. A peripheral machining apparatus comprising a frame, a member mounted for vertical sliding movement thereon, means for reciprocating said slide member, a hollow upright spindle rotatably mounted in said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, an axially movable push rod disposed in said hollow spindle, and means operated by the downward movement of said slide member for engaging said push rod with said article, said last mentioned means including a cam cooperating with the upper end of said push rod, a shaft rigid with said cam, an arm on said shaft, and a link connection between said arm and said slide member.

17. A peripheral machining apparatus comprising a frame, a member mounted for vertical sliding movement thereon, means for reciprocating said slide member, a hollow upright spindle rotatably mounted in said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, an axially movable push rod disposed in said hollow spindle, and means operated by the downward movement of said slide member for engaging said push rod with said article, said last mentioned means including a cam cooperating with the upper end of said push rod, a shaft rigid with said cam, an arm on said shaft, and a link connection between said arm and said slide member, said push rod being provided at its upper end with a head adapted during the upward movement of said slide member to be forced upwardly by the upper end of said spindle and thus lift said rod off said article.

18. A peripheral machining apparatus comprising a frame, a member mounted for vertical sliding movement thereon, means for reciprocating said slide member, a hollow upright spindle rotatably mounted on said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, and an axial movable push rod disposed in said spindle, a cam cooperating with the upper end of said push rod for forcing the same down on said article, a shaft rigid with said cam, an arm pivoted on said shaft, a link connection between said arm and said slide member, an arm fixed to said shaft in position to be engaged by the arm pivoted thereon, and a spring connection between said arms.

19. A peripheral machining apparatus comprising a frame, a member mounted for vertical sliding movements thereon, means for reciprocating said slide member, a hollow upright spindle rotatably mounted on said slide member, a tool head fixed to the lower end of said spindle, a support for the article to be machined disposed below and in axial alinement with said tool head, said tool head being provided with an axial opening adapted to accommodate said article in the lower position of said spindle, means for rotating said spindle, and an axial movable push rod disposed in said spindle, a cam cooperating with the upper end of said push rod for forcing the same down on said article, a shaft rigid with said cam, an arm pivoted on said shaft, a link connection between said arm and said slide member, an arm fixed to said shaft in position to be engaged by the arm pivoted thereon, a spring connection between said arms, and means for adjusting said shaft vertically comprising an arm pivoted to said frame for vertical swinging movement and rotatably supporting said shaft, and a member journaled on said frame and having a threaded connection with the free end of said shaft supporting arm.

PAUL KLAMP.
ALBERT L. BERGSTROM.